United States Patent [19]

Takata

[11] 4,309,740

[45] Jan. 5, 1982

[54] REMOTE CONTROLLER

[75] Inventor: Yasunobu Takata, Odawara, Japan

[73] Assignees: Nissan Motor Company, Limited; Ichiko Industries Limited, both of Yokohama, Japan

[21] Appl. No.: 941,742

[22] Filed: Sep. 12, 1978

[30] Foreign Application Priority Data

Sep. 26, 1977 [JP] Japan .................. 52-129670[U]

[51] Int. Cl.³ .................. B60Q 1/06; F16C 1/10
[52] U.S. Cl. .................. 362/66; 74/89.15; 74/502; 74/424.8 A
[58] Field of Search .......... 74/502, 503, 89.15, 74/499, 424.8 R, 424.8 A, 424.8 B; 362/43, 66

[56] References Cited

U.S. PATENT DOCUMENTS 2,504,408  4/1950  Griffin .................. 74/89.15

FOREIGN PATENT DOCUMENTS

| 2651682 | 5/1977 | Fed. Rep. of Germany | 362/43 |
| 233898 | 5/1925 | United Kingdom . | |
| 424814 | 2/1935 | United Kingdom | 74/502 |
| 481413 | 3/1938 | United Kingdom . | |
| 614327 | 12/1948 | United Kingdom . | |
| 789472 | 1/1958 | United Kingdom . | |
| 1103616 | 2/1968 | United Kingdom . | |
| 1188245 | 4/1970 | United Kingdom . | |
| 1503331 | 3/1978 | United Kingdom . | |
| 1520204 | 8/1978 | United Kingdom . | |

Primary Examiner—Kenneth Dorner

[57] ABSTRACT

A remote controller disclosed herein may be usable in a device for adjusting the angle at which the headlight beams from a motor vehicle are directed down onto the road surface. It comprises a guide case, a slide member mounted to the guide case for axial movement but against rotation with respect to the guide case, and a rotatable shaft rotatably mounted to the guide case for rotation but against axial movement with respect to the guide case. The slide member is adjusted by the rotatable shaft which engages with a threaded portion formed on the slide member. In order to limit the extent of axial movement of the slide member, the extent of rotation of the rotatable shaft is limited by a stop fixed to the rotatable shaft and abutment means fixed to the slide member and cooperating with the stop.

6 Claims, 12 Drawing Figures

REMOTE CONTROLLER

BACKGROUND OF THE INVENTION

This invention relates to a remote controller, and more particularly to a remote controller of a device for adjusting the angle at which the headlight beams from a motor vehicle are directed down onto the road surface, from within the vehicle.

As is well known the light beams emitted from the headlights of a motor vehicle will vary in response to the longitudinal inclination of the vehicle owing to a change in the weight distribution, such as owing to the passenger getting on or off the vehicle and/or owing to the addition or removal of a relatively large amounts of load or weight. If the light beams are varied and can not be directed properly, the blinding of the driver of an oncoming motor vehicle may occur or the proper front view may not be secured.

Thus a various kinds of devices have been proposed which control the angle at which the light beams are directed at the surface of the road.

One device proposed for controlling the above mentioned angle involves the headlights mounted on frames hingedly or pivotably mounted at the front of a motor vehicle and controls the beam angle by moving the headlight mounting frames via the use of a plurality of control wires from a remote controller installed within the reach of a driver.

Explaining this headlight beam angle adjusting device in connection with FIG. 1, the remote controller R, installed in the passenger compartment of the vehicle at the instrument panel or dash panel I and provided with a manually operable knob K, is connected to one terminal of a control wire W and pulls or pushes the control wire W in response to rotation in one direction or rotation in the opposite direction of the knob K, thereby to rotate a link, in the form of a two-arms lever L, rotatably mounted at the front bulk head of the vehicle. This rotation in one or the opposite direction of the lever L will pull or push two wires W' leading respectively to headlight mounting frames H.L, so as to move the headlight mounting frames H.L around their respective hinges to adjust them angularily, thereby to adjust the headlight beam angles of the headlights, not shown, mounted to the headlight mounting frames H.L. Each headlight mounting frame H.L is urged by means of a return springs S.S forwardly against a stopper S.

The remote controller R used in the adjusting device employs a slide member to which the one terminal of the control wire W is fixedly connected and a shaft which is rotatable by the knob K. The slide member is formed with a blind bore to receive the shaft and threads are formed in the bore and the shaft which are selected so that clockwise rotation of the knob K will urge the slide member either away from or toward same depending on ergonomical considerations (i.E. the location and the ease of use in that position). Counterclockwise rotation of the knob K will urge the slide member in the opposite direction to the direction of movement of the slide member due to the clockwise rotation of the knob K.

Since, in the construction as described above, the shaft threadedly engaged in the blind bore of the slide member is allowed to rotate relative to the slide member until the leading end of the shaft abuttingly engages the blind end of the bore, a driver has to sense with his fingers a slight increase in manipulation effort to turn the knob K so as to confirm the condition that the slide member has come to one of its limiting positions between which the longitudinal sliding movement of the slide member is permitted.

The problem encountered in the remote controller as described above is that since an increase in manipulation effort to turn the knob when the slide member has come to one limiting position thereof is gradual, a driver is likely to turn the knob in the same rotational direction excessively so that the subsequent return rotation of the knob might not be carried out with little manipulation effort on the part of the driver.

SUMMARY OF THE INVENTION

It is therefore an object of this invention to provide a remote controller which is free from the problem as above and which is provided with means whereby he or she who manipulates a knob of the controller may clearly and without an error sense with fingers thereof the condition that a slide member has come to one of limiting positions thereof.

DESCRIPTION OF THE PREFERRED EMBODIMENTS

Figure 1:
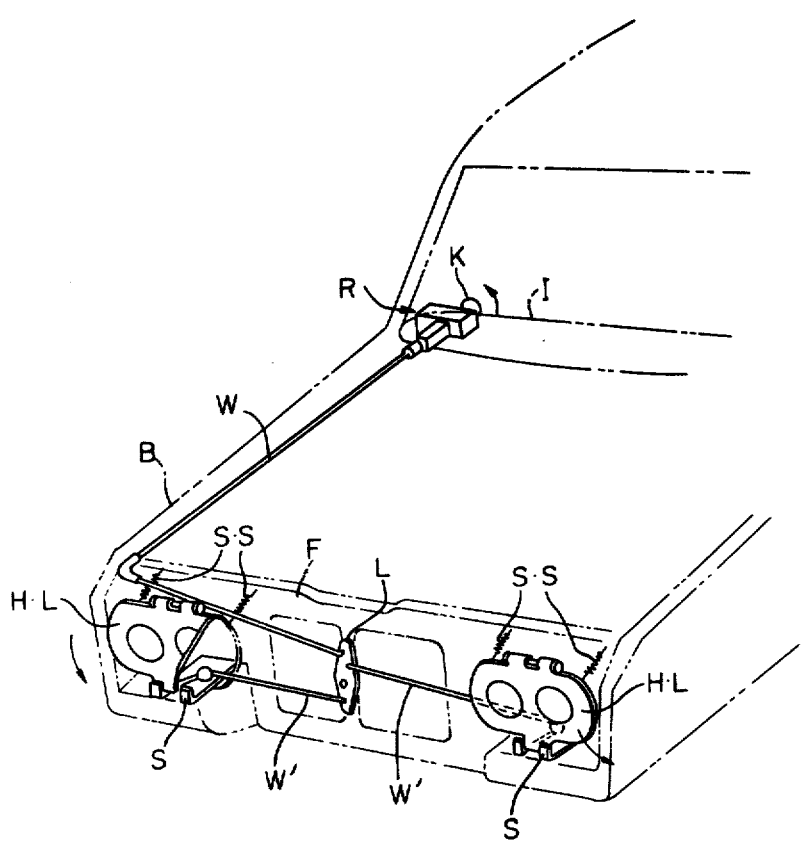
FIG. 1 is a schematic view showing the arrangement of a vehicle headlight beam adjusting device operatively mounted in a motor vehicle and employing a remote controller.
Figure 2:
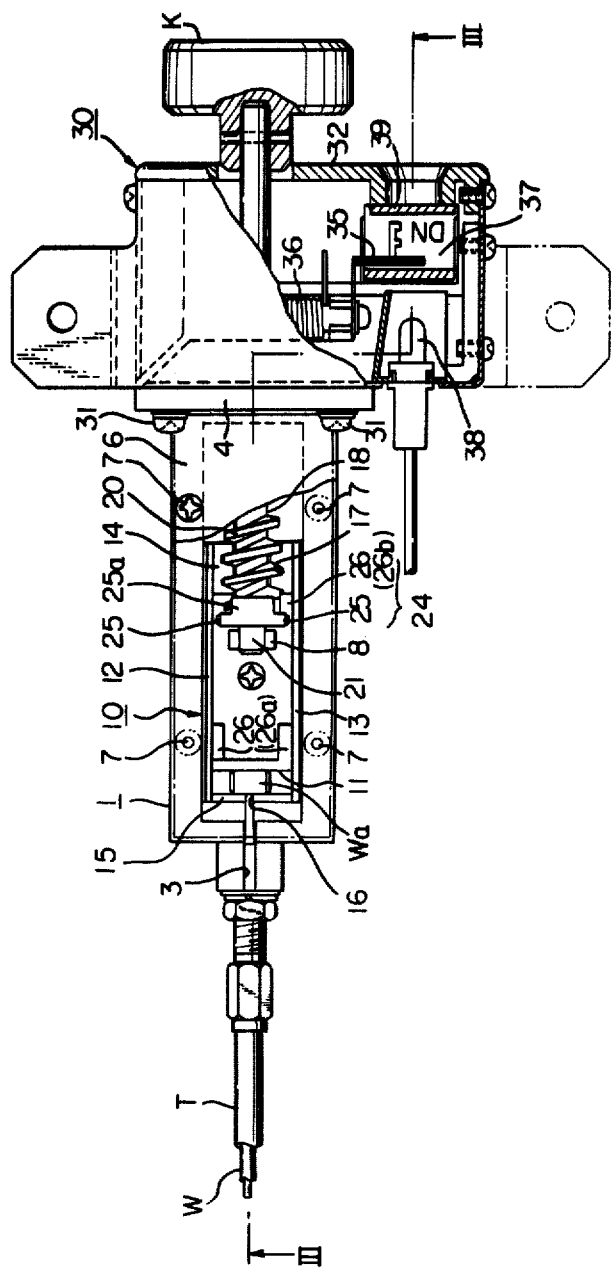
FIG. 2 is a side view, partly broken away to show a longitudinal section, of the first preferred embodiment of a remote controller according to this invention.
Figure 3:
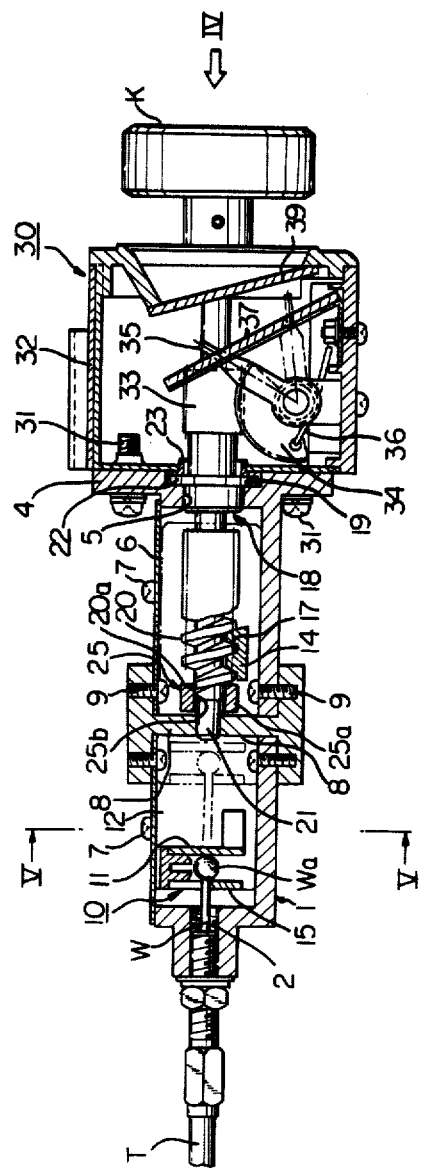
FIG. 3 is a sectional view taken through the line III—III of FIG. 2.
Figure 4:
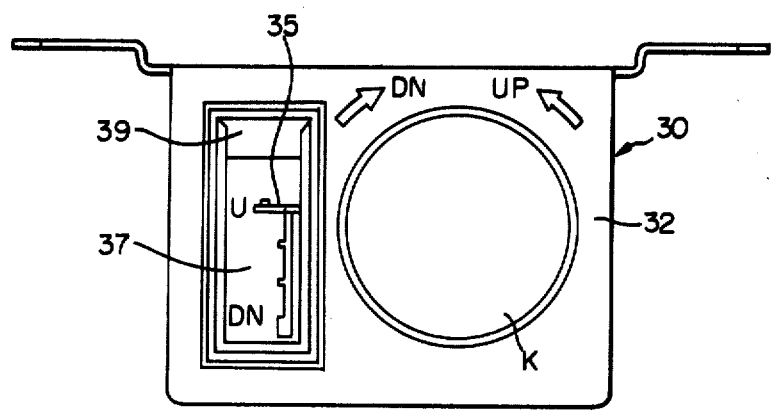
FIG. 4 is a plan view as viewed along an arrow IV of FIG. 3.
Figure 5:
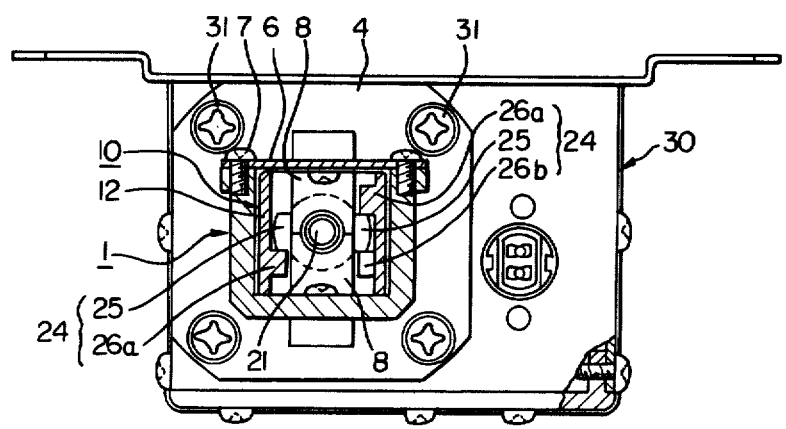
FIG. 5 is a sectional view taken through the line V—V of FIG. 3.

Referring to FIGS. 2 through 5, the numeral 1 denotes a guide case of a synthetic resin formed by a moulding process and the guide case 1 is mounted to an instrument panel I of a motor vehicle (see FIG. 1). Guide case 1 has a rectangular cross section bore, four flat side walls which are connected one after another to define the bore and a first end wall and a second flanged end wall which cooperate with the side walls to close ends of the bore. The first end wall has an outwardly projected portion formed with a threaded hole 2 extending therethrough (see FIG. 3) to fixedly receive therein one terminal end portion of an outer tube T of a control wire W (see FIG. 1). As shown in FIG. 2, a slit 3 is formed in the projection to permit, in assembly, the control wire W to pass therethrough toward the threaded bore 2. Flanged end wall 4 is formed with an opening 5 (see FIG. 8) through which a rotatable shaft extends. To the flanged end wall 4 an indicator unit 30 is secured (see FIGS. 2 and 3). One of the side walls is a case cover or lid 6 secured to the adjacent two of the other side walls by means of a plurality of screws 7. A pair or bearings 8 for supporting the rotatable shaft are fixedly mounted to the case cover 6 and the side wall opposite to the case cover 6, respectively, by means of a plurality of screws and disposed at an intermediate between the first end wall and the flanged second end wall 4.

The numeral 10 denotes a slide member of a metal which is slidably movable within the bore of the guide case 1 and which includes a front end wall 11, a left side wall 12, a right side wall 13 and a rear end block 14. The left side wall 12 and right side wall 13 extend in parallel to each other and are connected to the front end wall 11 and rear end block 14. Since the cross section of the slide member 10 and that of the bore of the guide case 1 are rectangular, relative rotation between the slide member 10 and the guide case 1 will not take place. An anchorage wall 15, which is formed with a slit 16, is fixedly mounted between the side walls 12 and 13 and spaced forwardly from the front end wall 11. The control wire W extends through the slit 16 of the anchorage wall 15 and a wire end block Wa disposed between the anchorage wall 15 and the front end wall 11 (see FIG. 2) functions to fixedly anchor the control wire W to the slide member 10. A threaded portion 17 is formed on the rear end block 14. In this embodiment, the thread, in the form of a female thread, is formed on the surface of a part-cylindrical groove of the rear end block 14 so as to cause the rear end block 14 to serve as a so-called half nut. This construction of the rear end block 14 will make possible the manufacturing of the rear end block 14 only by a moulding process because a tapping process is not required to form the thread. Another advantage of this construction of the rear end block 14 is that it will make the assembly of the rotatable shaft with the rear end block 14 easy.

The numeral 18 denotes the rotatable shaft having formed thereon within an area adjacent one end thereof a male threaded portion 20 which cooperates with the female threaded portion 17 of the slide member 10. At the opposite end of the rotatable shaft 18 a knob K is fixedly mounted. A small diameter rod 21 (see FIGS. 2 and 3) is formed at the end of the rotatable shaft 18 adjacent the forward end of the threaded portion 20 and is rotatably supported by the bearings 8. Adjacent the rearward end of the threaded portion 20 a radial extension 22 (see FIG. 3) is formed on the shaft 18 and is disposed between a shoulder 19 formed adjacent the opening 5 and a washer 23 kept in the illustrated operative position by an indicator 30 in order to prevent axial movement of the rotatable shaft 18 relative to the guide case 1. Manually rotating the knob K will therefore cause the longitudinal sliding movement of the slide member 10 within the guide case 1, thus pulling or pushing the control wire W fixed to the slide member 10.

According to the invention, a mechanism, generally denoted by the numeral 24, is provided which prevents further rotation of the shaft 18 in the same direction to let an operator notice that the slide member 10 has come to a limiting position, thereby to define the limiting position of the slide member 10.

This mechanism 24 involves a stop piece 25 fixedly mounted to the rotatable shaft 18 for rotation therewith and abutment means 26 formed on inner walls of the side walls 12 and 13.

If it is desired to define the rearward limiting position of the movement of the slide member 10, the abutment means 26 takes the form of a pair of projections 26a formed on the inner surfaces of the side walls 12 and 13 adjacent the forward ends thereof. The pair of projections 26a are arranged such that a pair of radial projections of the stop piece 25 will abut the projections 26a of the abutment means 26 when the slide member 10 has moved to the rearward limiting position (see FIGS. 7A and 7B).

If it is also desired to define the forward limiting position of the movement of the slide member 10, the abutment means involves, in addition to the aforementioned pair of projections 26a, a projection 26b on one of the inner surfaces of the side walls 12 and 13 (see FIG. 2).

Figure 6A:
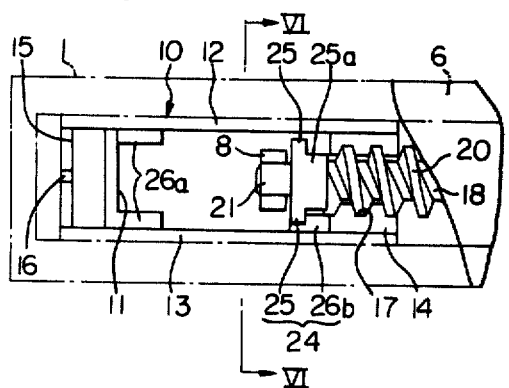
FIG. 6A is a partial view of FIG. 2 with unnecessary component parts removed to show the condition that the slide member has come to one of limiting positions thereof.
Figure 6B:
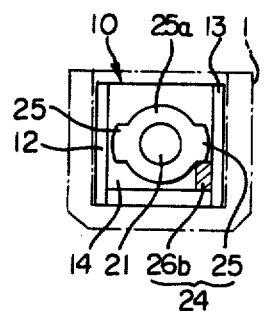
FIG. 6B is a sectional view taken through the line VI—VI of FIG. 6A.

The projection 26b is arranged such that, when the slide member 10 has moved to the forward limiting position, it will abut one of the radial projection of the stop piece 25 to prevent further rotation of the rotatable shaft 18 in the same direction (see FIGS. 6A and 6B). If desired, another projection may be formed on the inner surface opposite to the inner surface where the projection 26a is formed. This another projection shall be so arranged as to abut the remaining one of the projections of the stop piece when the slide member 10 has moved to the forward limiting position.

In this embodiment, the pair of projections 26a are formed on the inner surfaces of the side walls 12 and 13 adjacent the forward ends thereof and the single projection 26b is formed on the inner surface of the side wall 13 adjacent the rearward end thereof, as shown in FIG. 2.

The projection 26b arranged adjacent the rearward end of the side wall 13 extends into the interior of the slide member 10 and the amount of the extension of this projection 26b is selected such that the projection 26b will not be involved in interference contact with the male threaded portion 20. The amount of extension of each of the radial projections of the stop piece 25 is therefore selected such that it extends beyond outer diameter of the male threaded portion 20.

In the case that only the pair of projections 26a are arranged adjacent the forward ends of the side walls 12 and 13 to define the rearward limiting position of the slide member 10, the outer diameter of the stop piece 25 may not be larger than the outer diameter of the male threaded portion 20 because the projections 26a may extend enough into the interior of the slide member 10. The advantage derived from this is that since the outer diameter of the stop piece 25 is not larger than the outer diameter of the male threaded portion 20, the stop piece 25 will not become an obstacle to the insertion, in assembly, of the rotatable shaft 18 through the opening 5. Another advantage is that the stop piece may be formed integrally with the rotating shaft 18.

In the case that the pair of projections 26a are arranged adjacent the forward ends of the side walls 12, 13 and the projections 26a is arranged adjacent the rearward end of the side wall 13 to define the rearward and forward limiting positions of the slide member 10, as is the case in this embodiment, the stop piece 25 is physically separate from the rotating shaft 18 because, in this case, the outer diameter of the stop piece 25 is larger than the outer diameter of the male threaded portion 20 for the reason mentioned before. The stop piece 25 is detachably mounted to the leading end portion of the rotatable shaft 18 so as to be rotatable therewith. In this embodiment the relative rotation of the stop piece 25 to the rotatable shaft 18 is prevented by a radial groove 25b formed in a boss portion 25a of the stop piece 25 and a flat portion 20a, formed adjacent the forward end of the male threaded portion 20, received by the radial groove 25b.

Figure 9A:
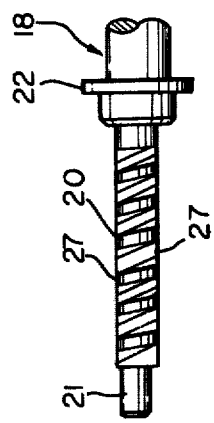
FIG. 9A is a side view of another alternative example of a rotatable shaft.
Figure 9B:
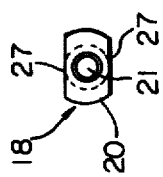
FIG. 9B is an end view of the rotatable shaft shown in FIG. 9A.

Although, in this embodiment, the rotatable shaft 18 has the rounded threaded portion 20 and the flat portion 20a, it is possible to make the threaded portion flattened to the same degree as the flat portion 20a, as shown in FIGS. 9A and 9B. In this case, it is not necessary to form the thread on the flat walls. This construction will make it possible to form the rotatable shaft by a moulding process only, thus eliminating a separate process of forming the thread.

Indicator 30 indicating the angle of the headlights H.L is secured to the rear flange 4 of the guide case 1 by means of a plurality of screws. The indicator 30 includes a housing 32, a worm gear 33 and a cooperating worm wheel 34 (see FIG. 3), a pointer 35 rotatably mounted within the housing 32 and rotatable by the worm wheel 34, a spring 36 (see FIG. 2) to prevent oscillation of the pointer 35 due to the backlash between the worm gear 33 and worm wheel 34, an indicator plate 35, a lamp 38 to apply a light to the back surface of the indicator plate 37 (see FIG. 2) to illuminate the same, and a lens 39 mounted within a window for the indication. Due to the worm gear 33 fixedly coupled with the rotatable shaft 18 and the worm wheel 34 meshing with the worm gear 33, fore and aft sliding movement of the slide member 10 will cause the pointer 35 to rotate about its axis so that the pointer 35 will indicate an appropriate location on the indicator plate 37 on which the letter UP (the abbreviation of up) and the letter DN (the abbreviation of down) are printed (see FIGS. 3 and 4). Therefore, the pointer 35 indicates the angle of the headlight beams.

The operation of the device is as follows: When the knob K is rotated to simultaneously rotates the shaft 18 the slide member 10 threadedly engaged with the shaft 18 is urged either away from or toward the knob K, i.e., the slide member 10 being urged forwardly or rearwardly within the guide case 1. When the slide member is urged rearwardly within the guide case 1 the cable W (see FIG. 1) is retracted in a similar direction to rotate the lever L clockwise, viewing in FIG. 1, thereby to retract the cables W' toward each other to adjust the headlight beams downwardly. When the slide member is urged forwardly within the guide case 1 the cable W is allowed to extend in a similar direction to rotate the level L anti-clockwise, thereby to permit the cables W' to extend away from each other to adjust the headlight beams upwardly.

When for the purpose of adjusting the headlight beam angle upwardly to a maximum the slide member 10 has been moved to the forward limiting position as shown in FIGS. 6A and 6B by rotation of the knob K, the stop piece 25 on the leading end of the shaft 18 will abut the projection 26b so that further rotation of the knob K in the same direction will be prevented. Since the abutting of the stop piece 25 on the projection 26b will prevent the rotation of the knob K, the forward limiting position of the slide member 10 will be felt clearly by an operator manipulating the knob K.

Figure 7A:
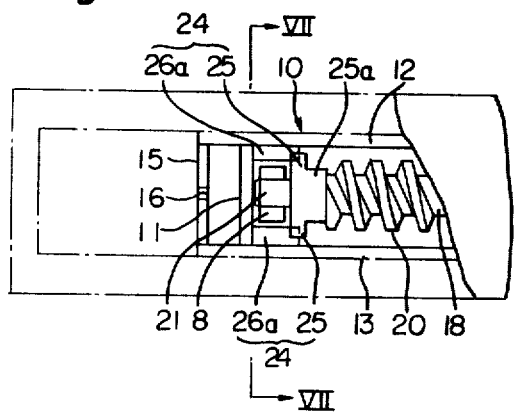
FIG. 7A is a similar view to FIG. 6A showing the condition that the slide member has come to the other limiting position.
Figure 7B:
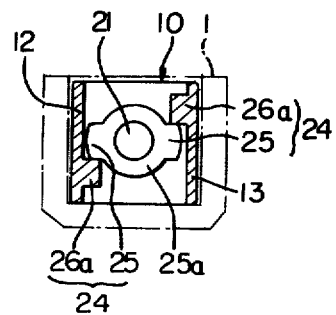
FIG. 7B is a section taken through the line VII—VII of FIG. 7A.

When for the purpose of adjusting the headlight beam angle downwardly to a maximum the slide member 10 has been moved to the rearward limiting position as shown in FIGS. 7A and 7B by rotation of the knob K, the stop piece on the leading end of the shaft 18 will abut the pair of projections 26a so that further rotation of the knob K in the same direction will be prevented.

Since the slide member 10 has its female threaded portion in half nut form, the abutment means 26, including the pair of projections 26a and the projection 26b, and the female threaded portion 17 can be made integral with the remaining portion of the slide member 10 by a moulding process alone.

Figure 8:
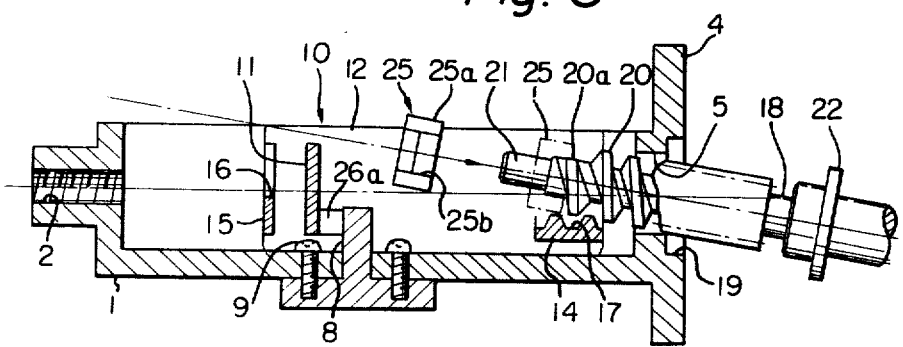
FIG. 8 is a longitudinal sectional exploded view of the remote controller, showing how to install the rotatable shaft and a stop piece in the guide case.

Another advantage derived from the half nut form female threaded portion 17 of the slide member 10 is that, in assembly the stop piece 25 can be easily assembled with the shaft 18 because, as shown in FIG. 8, after the slide member 10 has been placed in the guide case 1, when the rotating shaft 18 is inclined upwardly to the illustrated position after inserting through the aperture 5, the stop piece 25 can be easily coupled with the leading end portion of the shaft 18 and subsequently the male threaded portion 20 can be engaged with the female threaded portion 17 to mesh with the same. Therefore, skillful and difficult technique during the assembly have been unnecessiated.

The construction as shown in FIG. 9 may be used as a rotatable shaft 18, if desired, in which the threaded portion 27 is flattened to the same degree as the flattened portion 21. If this construction is used, the threaded portion of the shaft may be formed integrally with the remaining portion of the shaft by a moulding process only. This contributes to an improvement of productivity.

What is claimed is:

1. A remote controller comprising:
   a guide case;
   a slide member mounted on said guide case for axial movement but against rotation with respect to said guide case, said slide member having a threaded portion;
   a rotatable shaft rotatably mounted on said guide case for rotation but against axial movement with respect to said guide case, said rotatable shaft having a threaded portion in engagement with the threaded portion of said slide member for adjusting the position of said slide member with respect to said guide case;
   means for limiting the extent of rotation of said rotatable shaft with respect to said guide case to limit the extent of axial movement of said slide member with respect to said rotatable shaft;
   said slide member being of hollow construction, and said limiting means including a stop member fixed to said rotatable shaft and disposed in the interior of said slide member;
   first abutment means fixed to said slide member at a location adjacent to an end thereof and cooperating with said stop member and second abutment means fixed to said slide member at a location remote from said end thereof and cooperating with said stop member, said first and second abutment means being in the form of projections extending into the interior of said slide member.

2. A remote controller in a headlight beam adjusting device for a motor vehicle having a body and a headlight, the headlight beam adjusting device having pivotal mounting means for pivotally mounting the headlight on the vehicle body, means for biasing the headlight in one direction of tilt, and cable means connected at one terminal thereof to the mounting means for pulling the headlight in the opposite direction, the remote controller comprising:

a guide case;

a slide member mounted on said guide case for axial movement but against rotation with respect to said guide case, said slide member having a threaded portion;

a rotatable shaft rotatably mounted on said guide case for rotation but against axial movement with respect to said guide case, said rotatable shaft having a threaded portion in engagement with the threaded portion of said slide member for adjusting the position of said slide member with respect to said guide case;

means for limiting the extent of rotation of said rotatable shaft with respect to said guide case to limit the extent of axial movement of said slide member with respect to said rotatable shaft;

said slide member being of hollow construction, and said limiting means including a stop member fixed to said rotatable shaft and disposed in the interior of said slide member;

first abutment means fixed to said slide member at a location adjacent to an end thereof and cooperating with said stop member at a location remote from said end thereof and cooperating with said stop member, said first and second abutment means being in the form of projections extending into the interior of said slide member.

3. A remote controller as claimed in claim 1 or 2, in which said slide member is in the form of a box without a cover and a bottom.

4. A remote controller as claimed in claim 1 or 2, in which said first abutment means includes two projections arranged so as to be abuttingly and simultaneously engageable with said stop at the positions diametrically opposed with respect to the center of rotation of said rotatable shaft.

5. A remote controller as claimed in claim 1 or 2, in which said rotatable shaft has an end disposed within said slide member, and in which said guide case as fixedly mounted thereto support means supporting said end of the rotatable shaft within said slide member, said support means including a pair of bearings formed with semi-cylindrical bearing surfaces on which said end of the rotatable shaft is rotatably supported.

6. A remote controller as claimed in claim 2, in which the terminal portion of said cable means adjacent said slide member is substantially coaxial with said rotatable shaft.

* * * * *